United States Patent
Hu et al.

(10) Patent No.: US 10,915,737 B2
(45) Date of Patent: Feb. 9, 2021

(54) 3D POLARIMETRIC FACE RECOGNITION SYSTEM

(71) Applicant: U.S. Army Research Laboratory, Adelphi, MD (US)

(72) Inventors: Shuowen Hu, Silver Spring, MD (US); Nathaniel J. Short, Crofton, MD (US); Alex J. Yuffa, Lakewood, CO (US); Gorden Videen, Silver Spring, MD (US); Kristan P. Gurton, Olney, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 9 days.

(21) Appl. No.: 16/291,066

(22) Filed: Mar. 4, 2019

(65) Prior Publication Data

US 2020/0285838 A1 Sep. 10, 2020

(51) Int. Cl.
*G06K 9/00* (2006.01)
*G01J 5/58* (2006.01)
*G01J 4/04* (2006.01)
*G01J 5/00* (2006.01)

(52) U.S. Cl.
CPC ............ *G06K 9/00288* (2013.01); *G01J 4/04* (2013.01); *G01J 5/58* (2013.01); *G01J 2005/0077* (2013.01)

(58) Field of Classification Search
CPC .......... G06K 9/00288; G06K 9/00208; G06K 9/00221; G06K 9/00268; G01J 4/04; G01J 5/58; G01J 2005/0077; H04N 5/33; G06T 2200/08; G06T 17/00
See application file for complete search history.

(56) References Cited

U.S. PATENT DOCUMENTS

| | | | |
|---|---|---|---|
| 9,609,238 B2 | 3/2017 | Videen et al. | |
| 9,830,506 B2 | 11/2017 | Short et al. | |
| 2004/0151349 A1 | 8/2004 | Milne, III et al. | |
| 2006/0078172 A1* | 4/2006 | Zhang | G06K 9/00268 382/118 |
| 2009/0310828 A1 | 12/2009 | Kakadiaris et al. | |
| 2016/0070952 A1* | 3/2016 | Kim | G06K 9/00208 382/118 |
| 2016/0232709 A1* | 8/2016 | Videen | H04N 5/33 |

OTHER PUBLICATIONS

A. Kakadiaris, G. Passalis, G. Toderici, et al., "Three-dimensional face recognition in the presence of facial expressions: An annotated deformable model approach," IEEE Transactions on Pattern Analysis and Machine Intelligence 29 (4), 640-649, 2007.

(Continued)

*Primary Examiner* — Jianxun Yang
(74) *Attorney, Agent, or Firm* — Eric B. Compton

(57) ABSTRACT

Object/facial recognition systems, methods, architectures, mechanisms and/or apparatus for 3D face or object recognition using a 3D surface reconstructed from polarimetric thermal facial/object imager to form a 2D or 3D image which is rotated to conform with a pose of a reference image to allow comparison thereto.

22 Claims, 4 Drawing Sheets

(56) References Cited

OTHER PUBLICATIONS

N. Short, S. Hu, P. Gurram, K. Gurton, A. Chan, "Improving cross-modal face recognition using polarimetric imaging", Optics Letters, vol. 40(6), pp. 882-885, 2015.

K.P. Gurton, A.J. Yuffa, and G.W. Videen, "Enhanced facial recognition for thermal imagery using polarimetric imaging," Optics Letters, vol. 39(13), pp. 3857-3859, 2014.

K.P. Gurton, A.J. Yuffa, and G.W. Videen, "LWIR Polarimetry for Enhanced Facial Recognition in Thermal Imagery," Proc. of SPIE vol. 9099, 2014.

A.J. Yuffa, K.P. Gurton, G.W. Videen, "Three-dimensional facial recognition using passive long-wavelength infrared polarimetric imaging", Applied Optics, vol. 53(36), pp. 8514-8521, 2014.

* cited by examiner

3D POLARIMETRIC FACE RECOGNITION SYSTEM

GOVERNMENT INTEREST

The invention described herein may be manufactured, used and/or licensed by or for the Government of the United States for all governmental purposes without the payment of any royalty.

FIELD OF THE DISCLOSURE

The present disclosure relates generally to a 3D polarimetric face recognition system.

BACKGROUND

Existing face recognition systems predominately operate in the visible spectrum, and are dependent on illumination, face position and other factors. U.S. Pat. No. 9,609,238 toward a method for modeling a three-dimensional topological surface of an object from long-wave-infrared radiation (LWIR) emitted from the object. LWIR has a wavelength of approximately 7-11 um and is naturally emitted by facial tissue.

SUMMARY OF THE INVENTION

Various deficiencies in the prior art are addressed below by the disclosed object/facial recognition systems, methods, architectures, mechanisms and/or apparatus for 3D face or object recognition using a 3D surface reconstructed from polarimetric thermal facial/object imager to form a 2D or 3D image which is rotated to conform with a pose of a reference image to allow comparison thereto.

In various embodiments, polarimetric thermal image data associated with an object of interest is used for acquiring/calculating Stokes images S0, S1 and S2; generating a 3D surface of the object of interest using the acquired/calculated Stokes images; estimating a pose of the 3D surface of the object of interest using rotation (Euler) angles ($\alpha_b$, $\beta_b$, $\gamma_b$); rotating the 3D surface such that the pose of the object of interest provided therein substantially conforms to a pose of a reference object; and comparing the objects of interest to the reference object to generate thereby a similarity score.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Generally speaking, the various embodiments will be described within the context of a facial recognition system. However, the various embodiments are broadly applicable to recognition of any object such as a human, a vehicle, an animal, a stationary structure and the like. Therefore, the use of the term facial recognition system within the context of the specification should not be construed as limiting the applicability the various embodiments to facial recognition applications alone.

Figure 1:
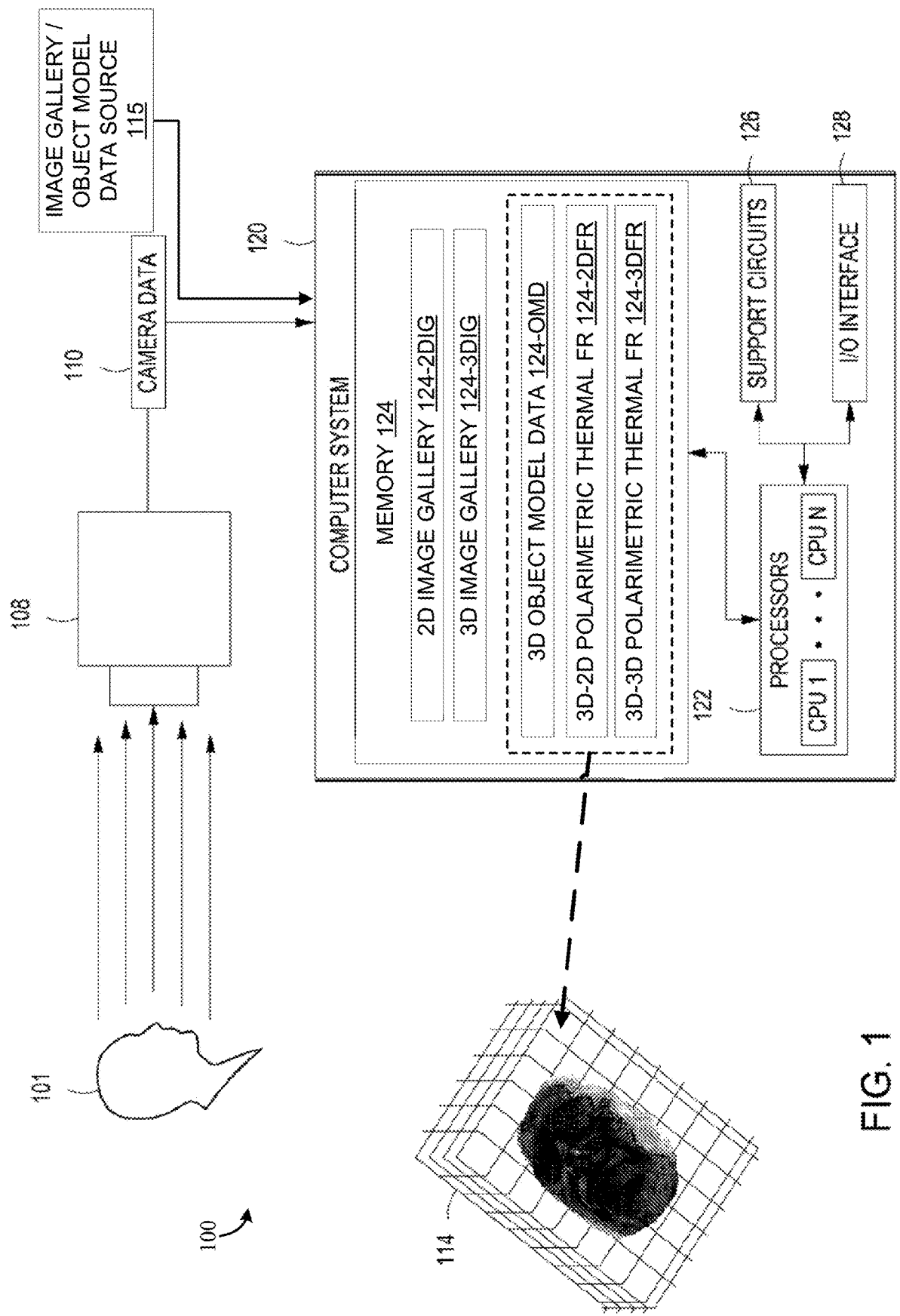
FIG. 1 is an illustration depicting an object recognition system in accordance with exemplary embodiments of the present invention.

FIG. 1 is an illustration depicting an object recognition system in accordance with exemplary embodiments of the present invention.

The system of FIG. 1 depicts a computer system 120 configured to provide the various processing functions described herein with respect to the embodiments. Other implementations are also contemplated and are considered to be within the scope of the invention as will be discussed in more detail below.

The system of FIG. 1 provides 3D face or object recognition using 3D object model data of a 3D surface reconstructed from polarimetric thermal facial imager.

In one embodiment, a 3D-to-2D face/object recognition system is implemented via a 3D-2D polarimetric thermal face recognition module 124-2DFR. In another embodiment, a 3D-to-3D face/object recognition system is implemented via a 3D-3D polarimetric thermal face recognition module 124-3DFR. Each embodiment contemplates acquiring polarimetric data from a local or remote camera for processing as described herein.

In an exemplary local image capture/processing embodiment, a thermal camera 108 is coupled to the computer system 120 and configured to acquire images representative of thermal radiation emitted by one or more target object(s) such as thermal radiation-emitting object 101. As such, the thermal camera 108 does not require a light source to illuminate the object 101. According to one embodiment, the thermal camera 108 is a polarimetric camera equipped with a Stirling-cooled mercury cadmium telluride focal-plane array of 640 by 480 pixels. In this embodiment, the array has a spectral response range of 7.5-11.1 μm. In this embodiment, the thermal camera 108 is configured to record a sequence of 32-bit images at a frame rate of 120 Hz, and a well-known Fourier modulation technique is applied to the images to obtain radiation data of object 101 in the form of a Stokes Vector recorded by camera 108, collectively referred to as camera data 110.

When positioned in a non-illuminated environment containing object 101, thermal camera 108 captures the radiation emitting from the object 101, illustratively a human face. The thermal camera 108 acquires thermal data emitted from the object 101 and generates camera data 110 corresponding to the radiation (e.g., long-wave-infrared radiation LWIR) emitted from the object 101. In one embodiment, the camera data 110 includes the polarization state of the total wave emanating from the object along with several other parameters as components of the Stokes vector. Those of ordinary skill in the art recognize that the Stokes vector comprises 4 elements: 1) total intensity of emitted radiation, 2) tendency of emitted radiation to be horizontally or vertically polarized, 3) tendency of radiation to be polarized at ±45-degree angle, 4) tendency of the radiation being right circularly or left circularly polarized. Those of ordinary skill in the art recognize that the degree of linear polarization (DoLP) may be calculated using S0, S1 and S2 by the thermal camera 108. The magnitude and direction of the electric field vector at each pixel is determinable based on these four elements. In this embodiment, the camera data 110 comprises at least the Stokes parameters (S0; S1; and S2) for each pixel of the array of camera 108. It is noted that a fourth element of the Stokes vector is S3 and contains circular polarization information and is not used in this invention. DoLP can be obtained from Vectors S0, S1, and S2 as mentioned above.

The camera 108 may be configured to output Stokes Vector data directly, or such values may be computed externally by an image processor for the camera data 110 or by some other computing means (e.g., computer system 120). The Stokes parameters may comprise a data vector in camera data 110. In general, for purposes of generating 3D object model data, only parameters S1 and S2 are utilized while S0 is generally not used, except to normalize the quantities to the total amount of intensity.

The recorded images contain both reflected and emitted waves. As a consequence of the Fresnel transmission equations, the emitted waves are polarized parallel to the plane of emission, which is defined by the line-of-sight of the camera and the surface normal N. In contrast, reflected waves are polarized perpendicular to this plane. In other words, the emitted and the reflected polarization states are orthogonal.

Various embodiments are configured to process camera data 110 to generate a three-dimensional model of an object, which may be optionally stored in memory 124 as 3D Object Model Data 124-OMD. Each embodiment optionally cooperates with other systems in use elsewhere to form a larger or shared 3D object model database, such as to improve processing of 2D or 3D images, to improve data stored in 2D or 3D image galleries (124-2DIG, 124-3DIG and/or 115) or for other purposes. For example, an external database 115 may be used to provide image gallery information, object model data and/or other data suitable for use in the various embodiments.

3D-to-2D Facial/Object Recognition Embodiments

Figure 2:
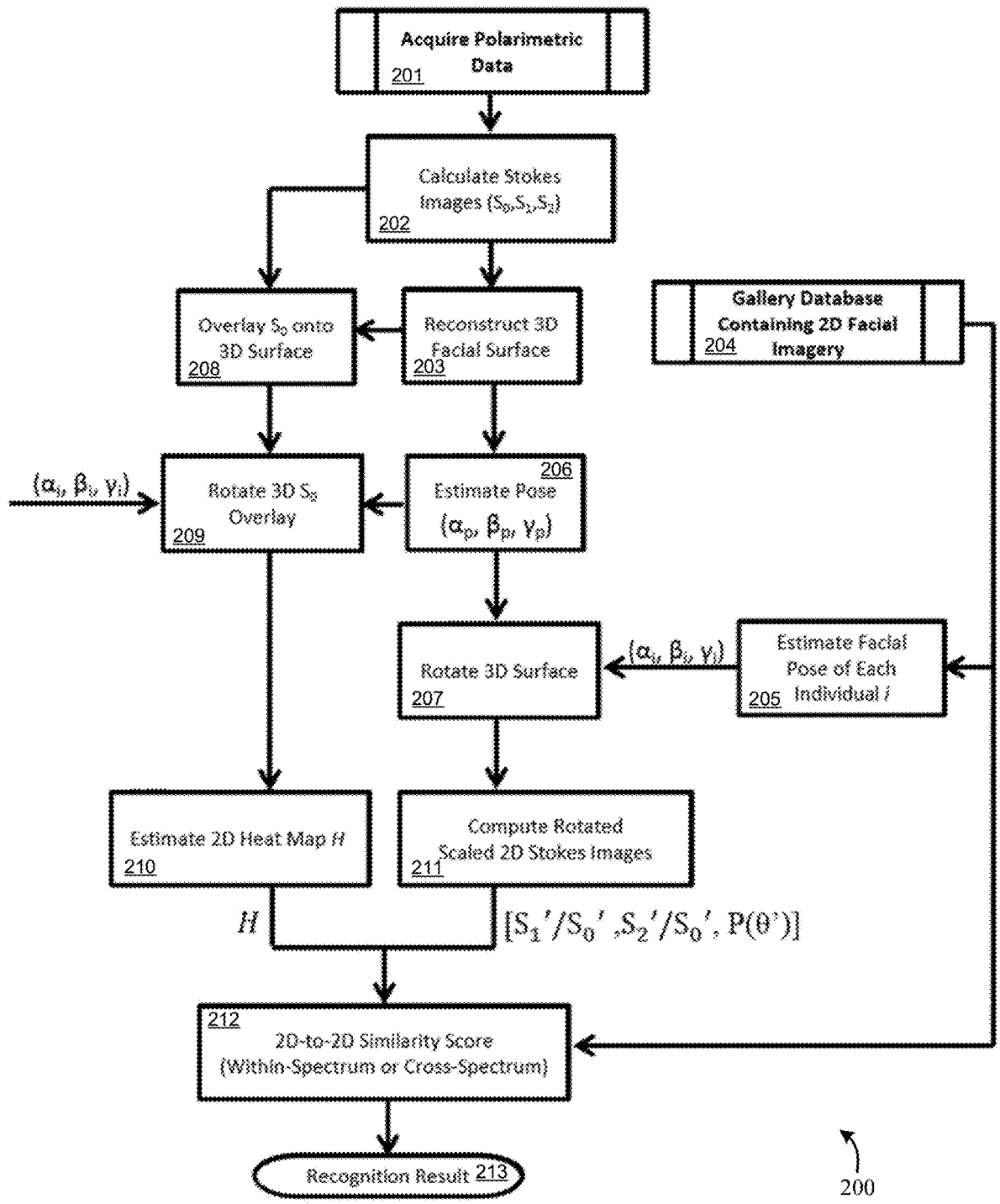
FIG. 2 is a flow diagram of a 3D-to-2D object recognition method suitable for use in the object recognition system of FIG. 1.

FIG. 2 is a flow diagram of a 3D-to-2D object recognition method suitable for use in the object recognition system of FIG. 1. For example, method 200 of FIG. 2 may be implemented by the 3D-2D polarimetric thermal face recognition module 124-2DFR and used to process captured polarimetric thermal imagery associated with an object (e.g., a face), adapt this imagery to achieve a pose or orientation substantially similar to that of each individual 2D image used for comparison purposes, and generate correlation/match information associated with one or more comparisons.

At step 201, polarimetric data of an object is acquired. As previous noted, polarimetric data of an object may be acquired via the camera 108 as camera data 110, or provided via an external or remote source of camera data. The polarimetric data is generally captured via a polarimetric sensor that is sensitive in the long-wave-infrared radiation (LWIR) spectrum range. Various polarimetric sensors may be used for the purpose of capturing polarization-state information associated with an object of interest.

Figure 4:
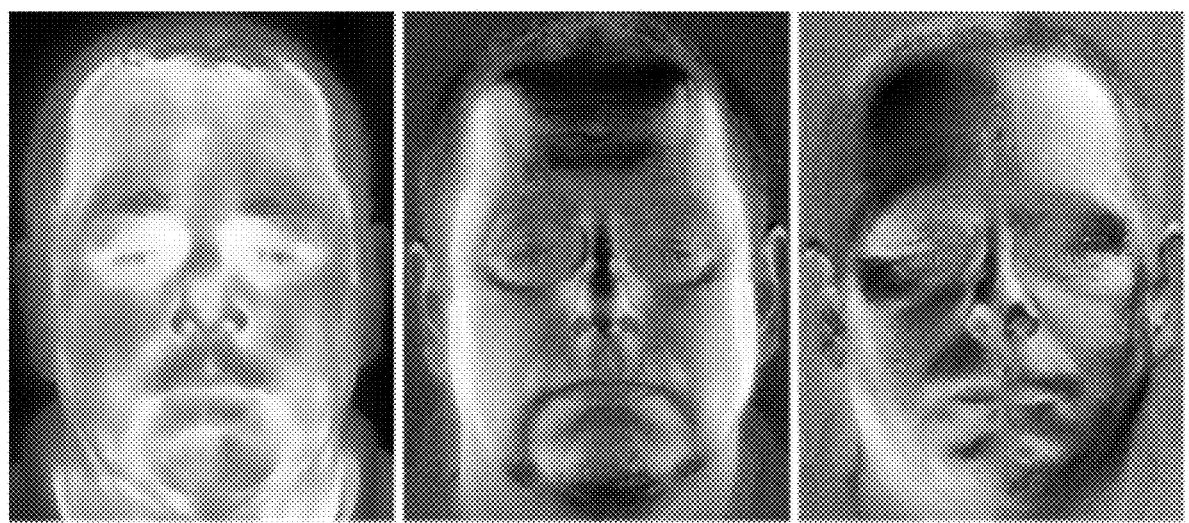
FIG. 4 depicts Stokes images $S_0$, $S_1$ and $S_2$ of a face.

At step 202, the polarization state of the emitted or reflected light of the object in the acquired polarimetric data is described by acquiring or calculating the Stokes parameters/images $S_0$, $S_1$ and $S_2$, such as first defined by Stokes in Transactions of the Cambridge Philosophical Society. These parameters are derived from measuring the radiant intensities of the linear states of polarization $I_0$, $I_{90}$, $I_{+45}$, and $I_{-45}$, at angles 0°, 90°, +45°, and −45°, respectively. Each of these Stokes parameters is acquired or calculated on a pixel-by-pixel basis to construct Stokes images/components of the imaged object. For example, various cameras and imaging devices generate Stokes parameters, which may be acquired directly from an onboard signal processing unit or polarimeter of a camera/imaging system, such may be output from the camera/imager for visualization or further processing. As an example, FIG. 4 depicts Stokes images $S_0$, $S_1$ and $S_2$ of a face.

At step 203, a reconstructed 3D object surface is generated, illustratively a facial surface. That is, given the Stokes images $S_0$, $S_1$ and $S_2$ generated at step 202, the polar angle θ between the surface normal and the cameras line-of-site is computed from the degree of linear polarization (DoLP) $P(\theta)$, as follows:

$$P(\theta) = \frac{\sqrt{S_1^2 + S_2^2}}{S_0} \quad \text{(eq. 1)}$$

Further, the associated azimuthal angle φ (the angle between the plane of the emission and a reference plane) is computed from the ratio of Stokes parameters/images $S_2$ to $S_1$ using a method such as described beginning at column 6, line 35 of U.S. Pat. No. 9,609,238. Briefly, this method provides that the azimuthal angle φ is calculated according to the following formula:

$$\psi = \varphi + (0 \text{ or } \pi), \quad \text{(eq. 2)}$$

where φ is defined as follows:

$$\varphi = \frac{1}{2} \begin{cases} \arctan\left(\frac{S_2}{S_1}\right) + \frac{\pi}{2}, S_1 \leq 0, \\ \arctan\left(\frac{S_2}{S_1}\right) + \pi, S_1 > 0 \text{ and } S_2 < S_1, \\ \arctan\left(\frac{S_2}{S_1}\right) + 0, S_1 > 0 \text{ and } S_2 \geq S_1 \end{cases} \quad \text{(eq. 3)}$$

The values of the Stokes parameters $S_1$ and $S_2$ may be contained in the camera data for each pixel in the image captured by the camera 108. Accordingly, φ is obtained and, subsequently, φ may be calculated. It is noted that equation X1 determines φ up to an ambiguity of π radians because the Stokes parameters contained in camera data are invariant under a rotation of π radians. Such an ambiguity constitutes an additional unknown in the mathematical solution, which ambiguity may be resolved by employing various boundary conditions as is known and described in U.S. Pat. No. 9,609,238.

From these angles, the surface normal N may be determined via geometrical relationships, and, after integrating the determined surface normal N using a method such as described beginning at column 7, line 10 of U.S. Pat. No. 9,609,238, the desired 3D facial surface is obtained by overlaying Stokes image $S_0$ onto the 3D surface determined at step 203. Briefly, this method provides that once φ is known, the surface normal for each pixel may be calculated according to the following equation:

$$N = -\frac{\partial}{\partial x} f(x, y)\hat{x} - \frac{\partial}{\partial y} f(x, y)\hat{y} + \hat{z} \quad \text{(eq. 4)}$$

and a simple geometric consideration leads to the following:

$$-\frac{\partial}{\partial x} f(x, y) = \tan \theta \cos \psi, \quad \text{(Eq. 5)}$$

$$-\frac{\partial}{\partial y} f(x, y) = \tan \theta \sin \psi. \quad \text{(Eq. 6)}$$

Since θ and ψ have already been solved, these values can be substituted in Equations 5 and 6 to solve for the derivative of $f(x, y)$ with respect to x and with respect to y. Finally, the surface normal vector N for each pixel is determined through equation 4.

At step 510, each normal vector N corresponding to a pixel of the captured image is integrated to generate a surface function which defines the surface $f(x, y)$ of the object.

A number of methods are available to integrate N and obtain $f(x, y)$ up to an additive constant. According to one embodiment, the Frankot-Chellapa method is chosen for simplicity and robustness to noise. The Frankot-Chellapa method enforces the integrability condition, $\nabla \times N = 0$, for all points on the support of $f(x, y)$ and thus, the surface normal is smoothed in cases where object 101 may have some surface discontinuities.

Figure 5:
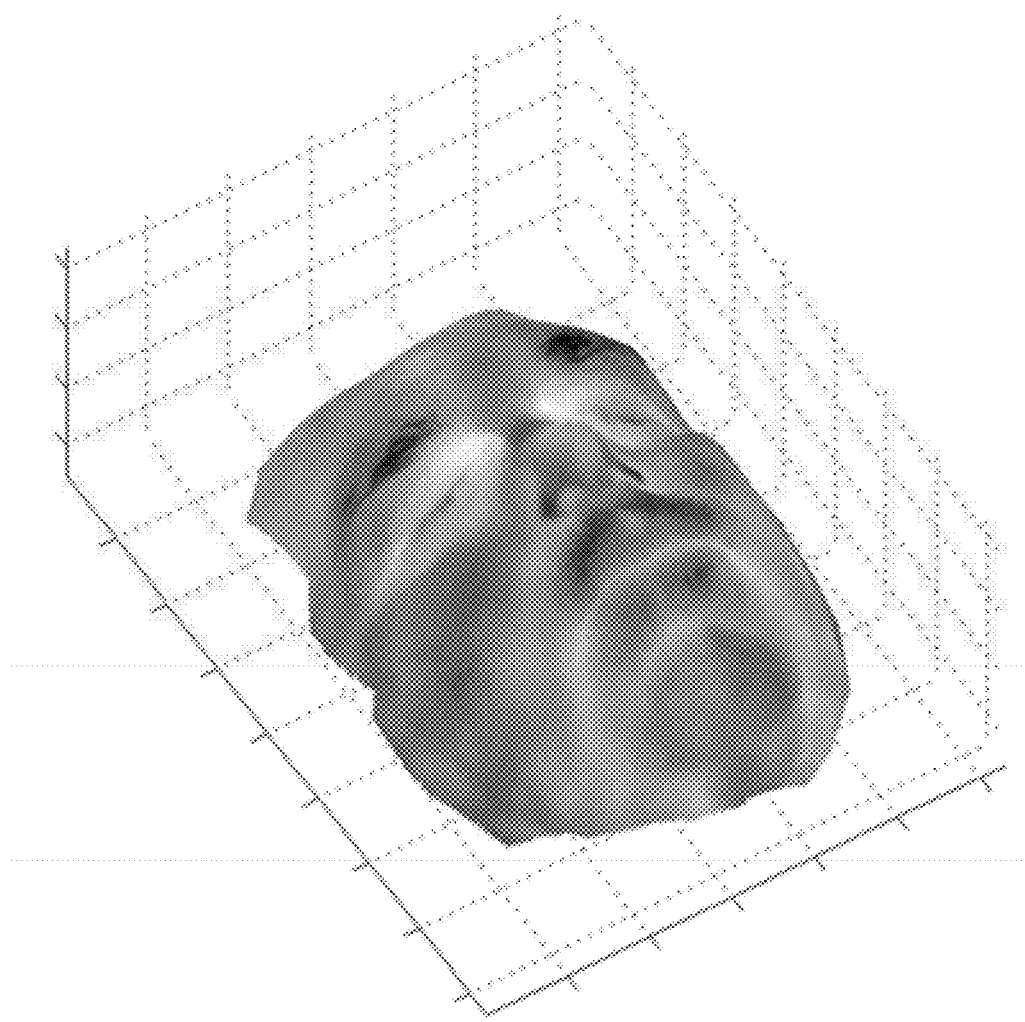
FIG. 5 depicts a reconstructed 3D facial surface with $S_0$ overlaid thereon of the face of FIG. 4.

As an example, FIG. 5 depicts a reconstructed 3D facial surface with $S_0$ overlaid thereon of the face of FIG. 4.

2D Object Image Gallery and Pose Adjustment

For purposes of this discussion, let the Stokes imagery generated above be referred to as a probe (e.g., facial imagery of an unknown person to be recognized) for use with a Gallery Database of 2D images (e.g., gallery 124-2DIG or 115) of known individuals in the thermal or visible spectrum against which the probe is to be matched. It is noted that any difference in the face pose between the probe and gallery imagery would lead to poor face/object recognition performance. To avoid the scenario, the 3D facial surface reconstructed from the Stokes images are used to adjust/align the pose of the probe imagery to enable more accurate matching/recognition.

At step 204, a gallery database of 2D images (e.g., from gallery 124-2DIG or 115) of known individuals (in this example, other types of objects and other examples) is accessed and, at step 205, an estimate of the facial pose of each individual i in the 2D image gallery is estimated. For example, in various embodiments the pose of individual i from the 2D image gallery is estimated in terms of the rotation (Euler) angles ($\alpha_i$, $\beta_i$, $\gamma_i$) relative to the x-, y-, and z-axis, respectively.

At steps 206-207 the pose of the probe is aligned to that of the currently selected individual i from the 2D image gallery. Specifically, to align the 3D facial surface to the pose of an individual i, the rotation (Euler) angles ($\alpha_b$, $\beta_b$, $\gamma_b$) at step 206 are computed using the orientation of the probe according to the below equations (eq. 7), and at step 207 the 3D surface reconstructed using Stokes images is rotated so that its new pose of the probe is the same as that of individual i in the gallery as estimated at step 205.

$$\alpha_b = \arccos(-Z_2/\sqrt{1-Z_3^2})$$

$$\beta_b = \arccos(Z_3)$$

$$\gamma_b = \arccos(-Y_3/\sqrt{1-Z_3^2}) \quad \text{(eq. 7)}$$

In various embodiments, model coordinates of a 3D facial surface may be defined as orthogonal unit vectors (X, Y, Z) representing the orientation of the probe's 3D facial surface (e.g., X is a vector from the left eye pointing to the right eye, Y is a vector from the midpoint between the eyes pointing to the base of the nose, and Z is a vector pointing outwards from the nose perpendicular to the XY-plane). For example, a 3D object has only two kinds of motions with respect to a camera; namely, translation and rotation. Translation comprises moving the camera from its current 3D location (X, Y, Z) to a new 3D location (X', Y', Z'). Translation contemplates three degrees of freedom and is represented by a vector t which is equal to (X-X', Y-Y', Z-Z'). Rotation comprises rotating a camera about the X, Y and Z axis. Rotation also contemplates three degrees of freedom. There are many ways of representing rotation, including Euler angles (roll, pitch and yaw), a 3×3 rotation matrix, a direction of rotation (i.e., axis) and angle, and so on. Estimating a pose comprises, in various embodiments, comprises determined the six parameters for rotation (e.g., (X, Y, Z)) and translation (e.g., Euler angles (roll, pitch and yaw). As discussed herein, these six parameters may be determined using 2D or 3D information derived from the various camera/imager data.

In one embodiment, the rotation is achieved by maximizing a degree of similarity between the pose of the probe and the currently selected individual i from the 2D image gallery. In this embodiment, let the pose of the probe be represented by the Euler angles $(\alpha_b, \beta_b, \gamma_b)$ and the pose of the individual i in the gallery be represented by $(\alpha_i, \beta_i, \gamma_i)$. The rotation that maximizes the similarity between of pose of the probe and the pose of individual i is given by the below equation (eq. 8).

$$R = R_z(\gamma_i)R_y(\beta_i)R_x(\alpha_i)(R_z(\gamma_b)R_y(\beta_b)R_x(\alpha_b))^T \quad \text{(eq. 8)}$$

where $$R_z(\gamma) = \begin{bmatrix} \cos(\gamma) & -\sin(\gamma) & 0 \\ \sin(\gamma) & \cos(\gamma) & 0 \\ 0 & 0 & 1 \end{bmatrix} \quad \text{(eq. 8.1)}$$

$$R_y(\beta) = \begin{bmatrix} \cos(\beta) & 0 & \sin(\beta) \\ 0 & 1 & 0 \\ -\sin(\beta) & 0 & \cos(\beta) \end{bmatrix} \quad \text{(eq. 8.2)}$$

$$R_z(\alpha) = \begin{bmatrix} 1 & 0 & 0 \\ 0 & \cos(\alpha) & -\sin(\alpha) \\ 0 & \sin(\alpha) & \cos(\alpha) \end{bmatrix} \quad \text{(eq. 8.3)}$$

In one embodiment, the rotation is achieved by maximizing the degree of symmetry achieved in the left and right halves of the pose of the probe. That is, since a database of images would generally include images taken face-on, these face-on images would be expected to have maximal symmetry. Thus, rather than maximizing a similarity between images, this embodiment maximized a left/right symmetry within the probe image. This embodiment is more computationally efficient. Other embodiments are also contemplated using known image rotation techniques.

At step 211, rotated scaled 2D Stokes images are computed using the pose-rotated reconstructed 3D surface generated at step 207. That is, the rotated 3D surface is used to compute the corresponding scaled Stokes images $S_1'/S_0'$ and $S_2'/S_0'$ as well as the degree of linear polarization $P(\theta)$ at the same pose as the individual in the gallery, as illustrated in the below equations (eq. 9), where if $\theta'$ and $\varphi'$ correspond to the polar and the azimuthal angles, respectively, of the rotated image, then:

$$\frac{S_1'}{S_0'} = P(\theta')\cos(2\phi'), \quad \text{(eq. 9.1)}$$

$$\frac{S_2'}{S_0'} = -P(\theta')\sin(2\phi'), \quad \text{(eq. 9.2)}$$

and $$P(\theta') = \frac{[1 - |r_\parallel(\theta')|^2] - [1 - |r_\perp(\theta')|^2]}{[1 - |r_\parallel(\theta')|^2] + [1 - |r_\perp(\theta')|^2]}, \quad \text{(eq. 9.3)}$$

where the Fresnel reflection coefficients are given by:

$$r_\parallel(\theta') = \frac{n^2\cos\theta' - \sqrt{n^2 - \sin^2\theta'}}{n^2\cos\theta' + \sqrt{n^2 - \sin^2\theta'}}, \quad \text{(eq. 10.1)}$$

$$r_\perp(\theta') = \frac{\cos\theta' - \sqrt{n^2 - \sin^2\theta'}}{\cos\theta' + \sqrt{n^2 - \sin^2\theta'}} \quad \text{(eq. 10.2)}$$

and n denotes the index of refraction of the skin.

At steps 208-210, a rotated heat/temperature map H is derived. Specifically, at step 208, the Stokes image $S_0$ acquired/calculated at step 202 is overlaid onto the 3D facial surface calculated at step 203, whereupon at step 209 the 3D $S_0$ overlay is rotated in accordance with the rotation (Euler) angles $(\alpha_i, \beta_i, \gamma_i)$ of the 3D facial surface pose estimated at step 206 and those $(\alpha_i, \beta_i, \gamma_i)$ of the currently selected individual i from the 2D image gallery so that the 3D $S_0$ overlay pose is the same as the pose as the currently selected individual i from the 2D image gallery. At step 210, this rotated 3D overlay is projected onto a plane perpendicular to the imaging axis to generate thereby a (estimated) rotated heat map H.

At step 212, a 2D-to-2D facial recognition analysis is performed using the complete set of the rotated and scaled probe images formed after steps 210 and 211 (i.e., [H, $S_1'/S_0'$, $S_2'/S_0'$, $P(\theta)$]) and having the same pose as the currently selected individual i from the 2D image gallery. Various face recognition algorithms may be used, and such algorithms can be used within the context of Within-Spectrum and/or Cross-Spectrum analysis.

In particular, the various steps described herein a similarity or confidence score between the objects associated with the acquired polarimetric data in each individual or object i within the 2D image gallery such that a measure of the confidence/likelihood that the person/object in the probe imagery is the same as the individual/object i from the 2D image gallery.

Generally speaking, face recognition can be divided into two categories; namely, identification and verification. For face identification, the various steps of the method 200 of FIG. 2 may be repeated for every individual/object in the gallery to compute a similarity score for each individual/object wherein the individual/object with the top similarity score is returned as a match. For face verification, where the task is to confirm whether a specific person/object in the probe imagery is the same as an individual/object associated with a particular 2D image within the 2D image gallery, then the similarity score of only that particular 2D images relevant and a threshold is applied to the similarity score to determine whether or not a match exists. That is, if the similarity score between the probe and an individual is above the threshold, then the face recognition system accepts the individual to be whom he or she claims to be.

Figure 3:
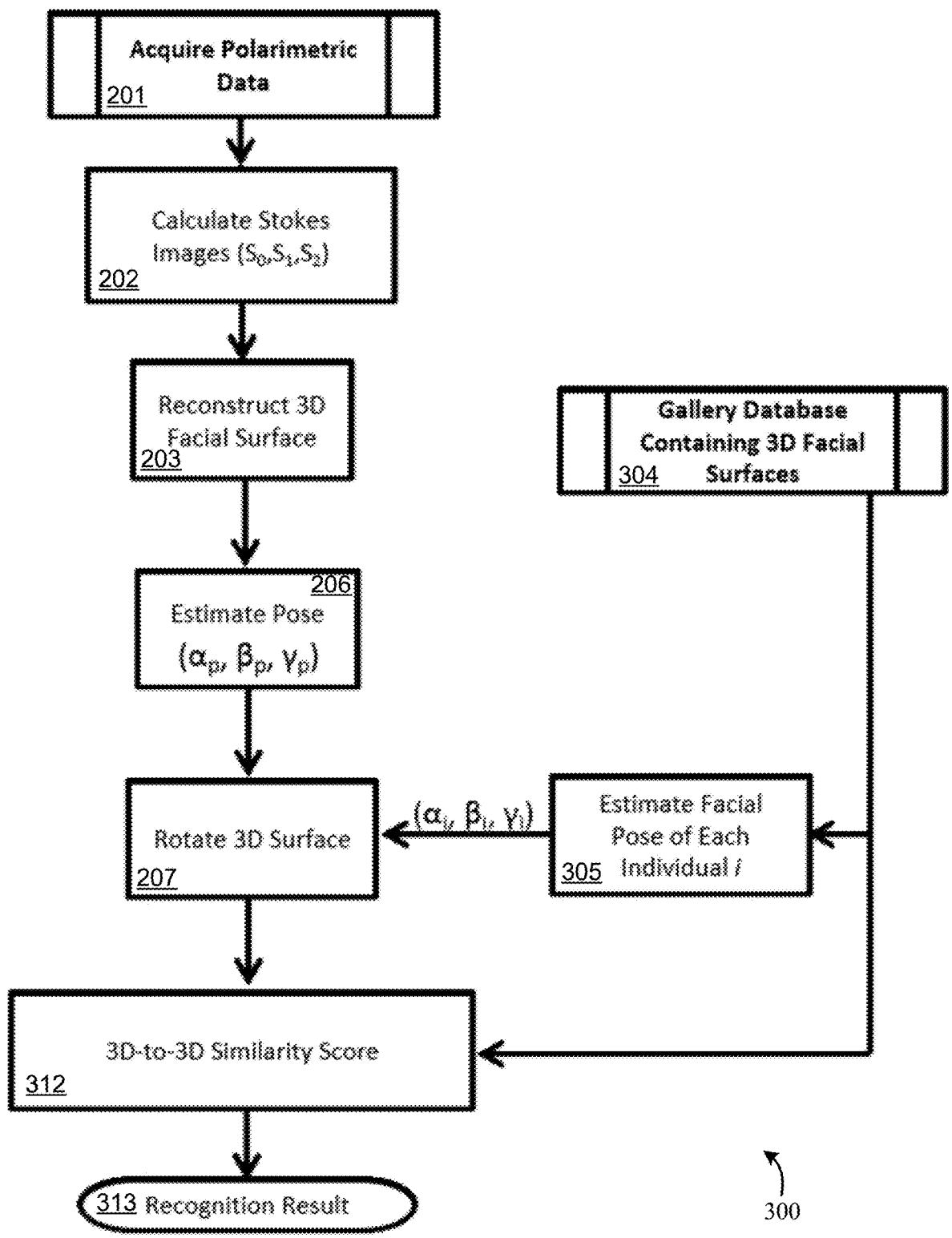
FIG. 3 is a flow diagram of a 3D-to-3D object recognition method suitable for use in the object recognition system of FIG. 1.

FIG. 3 is a flow diagram of a 3D-to-3D object recognition method suitable for use in the object recognition system of FIG. 1. For example, method 300 of FIG. 3 may be implemented by the 3D-3D polarimetric thermal face recognition module 124-3DFR and used to process captured polarimetric thermal imagery associated with an object (e.g., a face), adapt this imagery to achieve a pose or orientation substantially similar to that of each individual 2D image used for comparison purposes, and generate correlation/match information associated with one or more comparisons.

Substantial portions of the method 300 of FIG. 3 are performed in a manner similar to that of corresponding portions of the method 200 of FIG. 2. In particular, the method 300 of FIG. 3 contemplates that steps 201, 202, 203, 206 and 207 are performed in the order named and in substantially the same manner previously described with respect to the method 200 of FIG. 2. As such, detailed description of the steps not be repeated respect to the method 300 FIG. 3.

3D Object Image Gallery and Pose Adjustment

For purposes of this discussion, let the Stokes imagery generated above be referred to as a probe (e.g., facial imagery of an unknown person to be recognized) for use with a Gallery Database of 3D images (e.g., gallery 124-3DIG or 115) of known individuals in the thermal or visible spectrum against which the probe is to be matched. It is noted that any difference in the face pose between the probe and gallery imagery would lead to poor face/object recognition performance. To avoid the scenario, the 3D facial surface reconstructed from the Stokes images are used to adjust/align the pose of the probe imagery to enable more accurate matching/recognition.

At step 304, a gallery database of 3D images of known individuals (in this example, other types of objects and other examples) is accessed.

At step 305, an estimate of the facial pose of each individual i in the 3D image gallery (e.g., from gallery 124-3DIG or 115) is estimated. For example, in various embodiments the pose of individual i from the 3D image gallery is estimated in terms of the rotation (Euler) angles $(\alpha_i, \beta_i, \gamma_i)$ relative to the x-, y-, and z-axis, respectively.

At steps 206-207 the pose of the probe is aligned to that of the currently selected individual i from the 3D image gallery. Specifically, to align the 3D facial surface to the pose of an individual i, the pose of the probe is estimated by computing the rotation (Euler) angles $(\alpha_i, \beta_i, \gamma_i)$ at step 206, and at step 207 the 3D surface reconstructed using Stokes images is rotated so that its new pose is the same as that of individual i in the gallery as estimated at step 205.

At step 312, a 3D-to-3D facial recognition analysis is performed using the complete set of the rotated and scaled probe images formed after step 207 (i.e., $[S_1'/S_0', S_2'/S_0', P(\theta)]$) and having the same pose as the currently selected individual i from the 3D image gallery. Various face recognition algorithms may be used for 3D-to-3D facial recognition, such as the deformable model-based 3D face recognition approach. Suitable face recognition algorithms are also discussed in I. A. Kakadiaris, G. Passalis, G. Toderici, et al., "Three-dimensional face recognition in the presence of facial expressions: An annotated deformable model approach," IEEE Transactions on Pattern Analysis and Machine Intelligence 29 (4), 640-649, 2007.

In particular, the various steps described herein a similarity or confidence score between the objects associated with the acquired polarimetric data in each individual or object i within the 3D image gallery such that a measure of the confidence/likelihood that the person/object in the probe imagery is the same as the individual/object i from the 3D image gallery. The degree of similarity between two 3D surfaces (i.e., between the 3D probe and the 3D face of an individual in the gallery) can be measured using common metrics such as the Minkowski distance, Hausdorff distance, and Frechet distance.

For face identification, the various steps of the method 300 of FIG. 3 may be repeated for every individual/object in the gallery to compute a similarity score for each individual/object wherein the individual/object with the top similarity score is returned as a match. For face verification, where the task is to confirm whether a specific person/object in the probe imagery is the same as an individual/object associated with a particular 2D image within the 2D image gallery, then the similarity score of only that particular 2D images relevant and a threshold is applied to the similarity score to determine whether or not a match exists. That is, if the similarity score between the probe and an individual is above the threshold, then the face recognition system accepts the individual to be whom he or she claims to be.

It is noted that the 3D-to-2D method 200 of FIG. 2 and the 3D-to-3D method 300 of FIG. 3 are similar in that both employ polarimetric thermal based 3D facial reconstructions but are different in the matching framework.

In various embodiments, the gallery databases of 2D images utilized at step 204 of FIG. 2 and/or 3D images utilized at step 304 of FIG. 3 may be local (e.g., 124-2DIG, 124-3DIG, local database 115) or remote (e.g., remote database 115) with respect to a system operating in accordance with the various embodiments. Further, the gallery databases may be operated/updated via a centralized database manager, a third party such as a database management entity or some other entity.

In various embodiments, the similarity scores calculated at step 212 of FIG. 2 and/or 312 of FIG. 3 are calculated using a remote or third-party entity such as optionally associated with a remote database. Specifically, in these embodiments the remote or third party entity (e.g., a server implementing the image gallery/object model data source 115) may be configured to maintain one or both of the 2D and 3D gallery databases and use the maintained gallery information to perform a comparison with 2D or 3D imagery transmitted to the remote or third party (e.g., via computer system 120) and responsively return a similarity score (e.g., to computer system 120).

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

The invention claimed is:

1. A computer implemented object recognition method, comprising:

acquiring or calculating long-wave-infrared radiation (LWIR) Stokes images $S_0$, $S_1$ and $S_2$ using polarimetric imaging of an object of interest;

generating a 3D Stokes image $S_0$ surface overlay of the object of interest using the acquired Stokes images;

estimating a pose of the 3D Stokes image $S_0$ surface overlay of the object of interest using rotation (Euler) angles $(\alpha_i, \beta_i, \gamma_i)$;

rotating the 3D Stokes image $S_0$ surface overlay such that the pose of the object of interest provided therein substantially conforms to a pose of a reference object; and generating a heat map of the rotated 3D Stokes image $S_0$ surface overlay.

2. The method of claim 1, wherein the heat map of the rotated 3D Stokes image $S_0$ surface overlay of the object of interest comprises a 3D heat map of the object of interest and the method further comprises: comparing the 3D heat map of the object of interest to the reference object to generate thereby a similarity score.

3. The method of claim 2, wherein said step of comparing comprises comparing the generated 3D heat map of the object of interest with a 3D surface of the reference object.

4. The method of claim 2, wherein said step of comparing is performed by a remote server in response to receiving 3D surface imagery of the object of interest.

5. The method of claim 1, further comprising:
projecting the heat map of the rotated 3D Stokes image $S_0$ surface overlay of the object of interest onto a plane perpendicular to the imaging axis to generate a 2D rotated heat map of the object of interest,
wherein said step of comparing comprises comparing the 2D rotated heat map of the object of interest with a 2D surface of the reference object.

6. The method of claim 5, wherein said step of comparing is performed by a remote server in response to receiving 2D surface imagery of the object of interest.

7. The method of claim 5,
wherein the step of comparing further comprises: comparing the 2D heat map of the object of interest with the 2D surface of the reference object.

8. The method of claim 7, wherein said step of rotating the 3D Stokes image $S_0$ surface overlay is performed by maximizing a similarity between the pose of the object of interest provided therein and the pose of a reference object.

9. The method of claim 7, wherein said step of rotating the 3D Stokes image $S_0$ surface overlay is performed by maximizing a left/right symmetry of the pose of the object of interest.

10. The method of claim 1, wherein said step of rotating the 3D Stokes image $S_0$ surface overlay is performed by maximizing a similarity between the pose of the object of interest provided therein and the pose of a reference object.

11. The method of claim 1, wherein said step of rotating the 3D Stokes image $S_0$ surface overlay is performed by maximizing a left/right symmetry of the pose of the object of interest.

12. The method of claim 1, wherein said steps of rotating and comparing are performed for each of a plurality of reference objects within a reference object database, said method further comprising identifying a reference object associated with the highest similarity score.

13. The method of claim 1, wherein said steps of rotating and comparing are performed for a specific of reference object within a reference object database, said method further comprising identifying a reference object to match said object of interest in response to a similarity score exceeding a threshold level.

14. An apparatus for object recognition, the apparatus comprising a processor configured for:
acquiring or calculating a Stokes images $S_0$, $S_1$ and $S_2$ using polarimetric sensor information associated with an object of interest;
generating a 3D Stokes image $S_0$ surface overlay of the object of interest using the acquiring Stokes images;
estimating a pose of the 3D Stokes image $S_0$ surface overlay of the object of interest using rotation (Euler) angles ($\alpha_i$, $\beta_i$, $\gamma_i$);
rotating the 3D Stokes image $S_0$ surface overlay such that the pose of the object of interest provided therein substantially conforms to a pose of a reference object; and
generating a heat map of the rotated 3D Stokes image $S_0$ surface overlay.

15. The apparatus of claim 14, wherein said processor being further configured to compare the generated heat map of the rotated 3D Stokes image $S_0$ surface overlay of the object of interest to the reference object to generate thereby a similarity score.

16. The apparatus of claim 15, wherein said comparing comprises comparing the generated heat map of the rotated 3D Stokes image $S_0$ surface overlay of the object of interest with a 3D surface of the reference object.

17. The apparatus of claim 15, wherein said processor being further configured to project the heat map of the rotated 3D Stokes image $S_0$ surface overlay onto a plane perpendicular to the imaging axis to generate a 2D rotated heat map, and said comparing comprises comparing the 2D rotated heat map of the object of interest with a 2D surface of the reference object.

18. The apparatus of claim 15,
wherein the step of comparing further comprises comparing the 2D heat map of the rotated Stokes image $S_0$ surface overlay of the object of interest with the 2D surface of the reference object.

19. The apparatus of claim 15, wherein said steps of rotating and comparing are performed for each of a plurality of reference objects within a reference object database, said processor being further configured for identifying a reference object associated with the highest similarity score.

20. The apparatus of claim 15, wherein said steps of rotating and comparing are performed for a specific of reference object within a reference object database, said processor being further configured for identifying a reference object to match said object of interest in response to a similarity score exceeding a threshold level.

21. The apparatus of claim 14, wherein said rotating the 3D Stokes image $S_0$ surface overlay is performed by one or both of maximizing a similarity between the pose of the object of interest provided therein and the pose of a reference object, and maximizing a left/right symmetry of the pose of the object of interest.

22. A tangible and non-transient computer readable storage medium storing instructions which, when executed by a computer, adapt the operation of the computer to provide a method for object recognition, comprising:
acquiring or calculating Stokes images $S_0$, $S_1$ and $S_2$ using polarimetric sensor information associated with an object of interest;
generating a 3D Stokes image $S_0$ surface overlay of the object of interest using the acquiring Stokes images;
estimating a pose of the 3D Stokes image $S_0$ surface overlay of the object of interest
rotating the 3D Stokes image $S_0$ surface overlay such that the pose of the object of interest provided therein substantially conforms to a pose of a reference object; and
generating a 2D or 3D heat map of the rotated 3D Stokes image $S_0$ surface overlay.

* * * * *